United States Patent

[11] 3,592,486

| [72] | Inventor | James M. Fox<br>2238 Phillipi St., Sarasota, Fla. 33581 |
|---|---|---|
| [21] | Appl. No. | 842,277 |
| [22] | Filed | July 16, 1969 |
| [45] | Patented | July 13, 1971 |

[54] APPARATUS FOR CONNECTING TWO BICYCLES IN SIDE-BY-SIDE RELATION
6 Claims, 8 Drawing Figs.

| [52] | U.S. Cl. | 280/209 |
|---|---|---|
| [51] | Int. Cl. | B62k 13/06 |
| [50] | Field of Search | 280/209, 231, 222 |

[56] References Cited
UNITED STATES PATENTS

| 707,122 | 8/1902 | Kynaston | 280/209 |
|---|---|---|---|
| 2,248,223 | 7/1941 | Fellman et al. | 280/209 |
| 3,175,843 | 3/1965 | Burke | 280/231 X |
| 3,350,115 | 10/1967 | Ferrary | 280/209 |

*Primary Examiner*—Kenneth H. Betts
*Attorney*—Rohe Meyer

ABSTRACT: The present invention relates to devices for connecting two bicycles in parallel side-by-side relation to permit simultaneous operation by the party seated on either of the bicycles, and comprises a plurality of elements ensuring simultaneous steering of the front wheels of both bicycles by the rider on only one bicycle, as well as means to render the handle bars of one of the bicycles immobile for the purpose of steering together with spacing connecting elements connecting the two bicycles at an intermediate point of their length and at the rear wheel axles. The intermediate and rear axle connecting elements are adjustable to permit tightening or loosening of the chains of the bicycles.

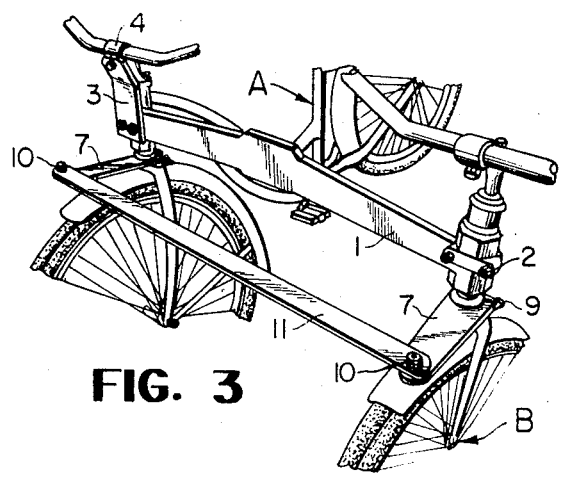
FIG. 3
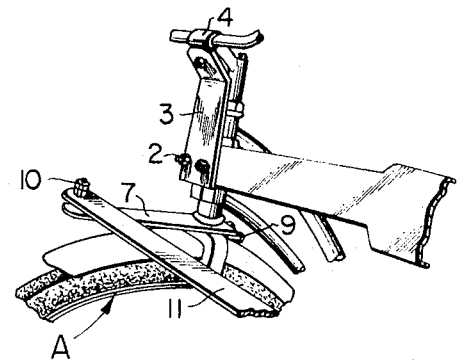
FIG. 4
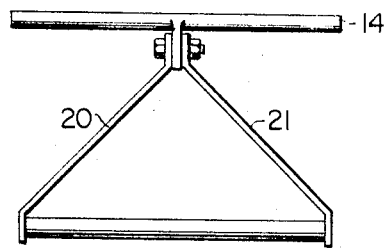
FIG. 5
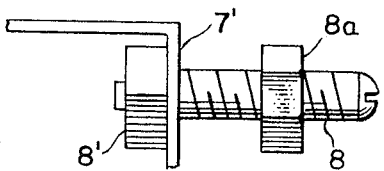
FIG. 3A
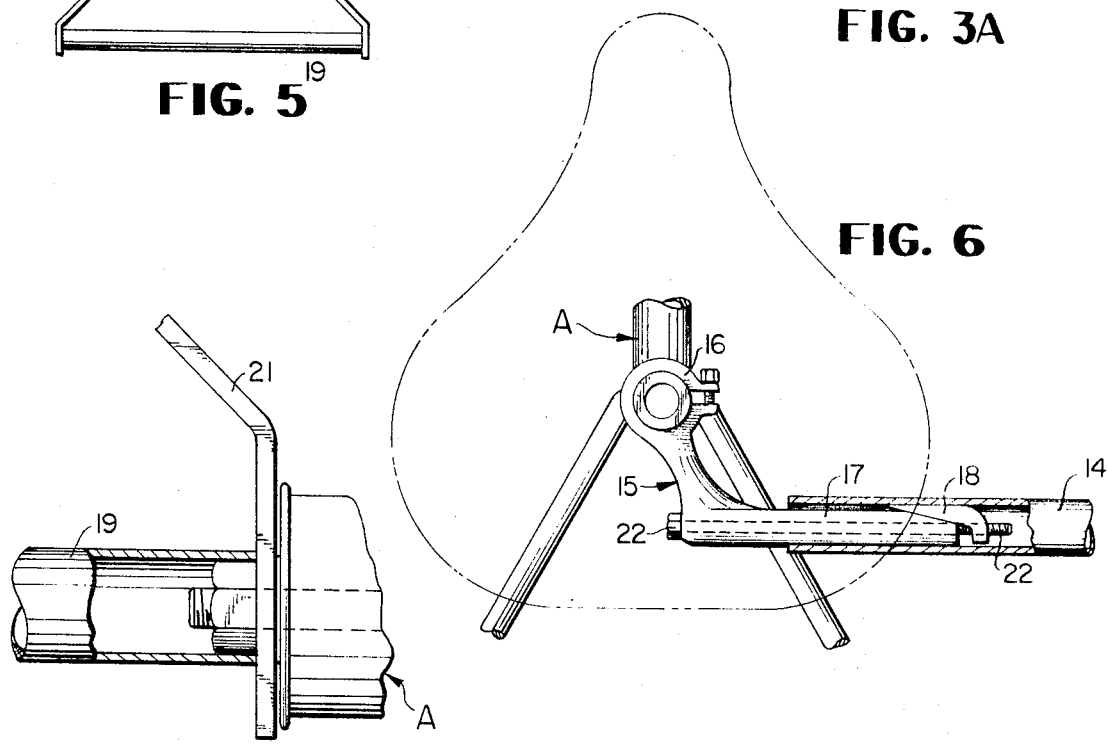
FIG. 6
FIG. 7

APPARATUS FOR CONNECTING TWO BICYCLES IN SIDE-BY-SIDE RELATION

The primary object of the present invention is to provide an arrangement of bicycles whereby two people may ride side by side in complete safety without liability of turning the bicycles over, accidents, incident to simultaneous steering of the two bicycles in diverse direction by immobilizing the handle bars of one of the bicycles and thus permit riding over trails, etc., by two persons, one of whom may be incapable for any reason of operating a bicycle, and further to connect the two bicycles rigidly in side-by-side relation to ensure their operation and movement in unison.

Another object of the present invention is to provide structures for connecting two bicycles as above set out, which may be readily and comparatively easily attached to the two bicycles or detached therefrom without in any way injuring or mutilating the bicycles, so that the structures may be marketed in a kit, together with instructions for assembly.

With these and other objects in view, as may appear from the accompanying specification, the invention consists of various features of construction and combination of parts, which will be first described in connection with the accompanying drawings, showing an apparatus for connecting two bicycles in side-by-side relation of a preferred form embodying the invention and the features forming the invention will be specifically pointed out in the claims.

In the drawings:

FIG. 3 is a view of the mechanism by means of which the two bicycles are connected for simultaneous steering. FIG. 3A is a detailed fragmentary view showing the construction of the adjusting bolts for attaching the steering plates to the wheel forks of the bicycles.

FIG. 4 is a detailed view showing the immobilizing plate and its relation to the handle bars of one of the bicycles.

FIG. 5 is a view in diagrammatic plan of the intermediate and rear axles connecting bars.

FIG. 6 is a detailed view showing the manner of connecting the intermediate connecting bar to the saddle supporting standard of each bicycle, illustrating the means for tightly holding this bar in place or releasing it for relatively rotary movement.

FIG. 7 is a detailed view partly in section showing the connection between the rearmost spacing and bracing bat with the rear axle of one of the bicycles.

Figure 1:
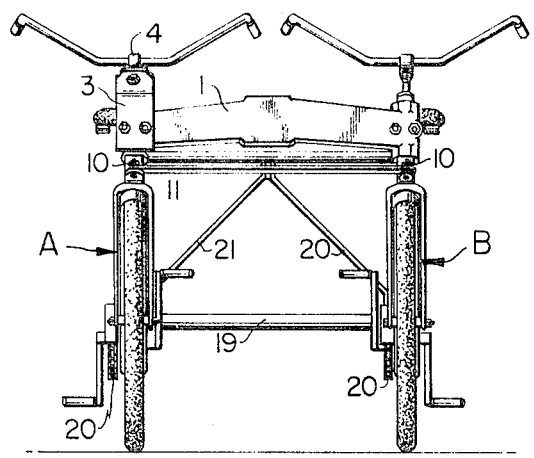
FIG. 1 is a front view of two bicycles connected in accordance with this invention.

Referring more particularly to the drawings, two bicycles A and B which are of the same make, type and size are rigidly connected at their front ends by means of the stabilizing spacing bar 1. This bar 1 is attached to the frame of the bicycles by means of U-bolts 2 in such manner as to permit steering movement of the front wheels of the bicycles and a handle bar immobilizing plate 3 is attached to the spacing bar at one end and projects upwardly therefrom having its upper end curved to engage the handle bars of one of the bicycles and is rigidly connected to the collar 4 through which the handle bar carrying stem of the front wheel fork 5 extends. Thus the immobilizing plate 3 will, by its engagement with the handle bars of one of the two bicycles prevent steering movement of said handle bars. The mechanism utilized for normally connecting the handle bar stem to the wheel-carrying fork of the bicycle is rendered immobolized so as to allow the fork and wheel to move independently as do the handle bars and their stem. In some types of bicycles the handle bar stem is connected to the fork by a wedge bolt (not shown) and in assembling the present device this wedge-clamp bolt is loosened so that stem moves freely in fork and allows the front wheel of the affected bicycles to follow the steering of the front wheel of the other bicycle.

Figure 2:
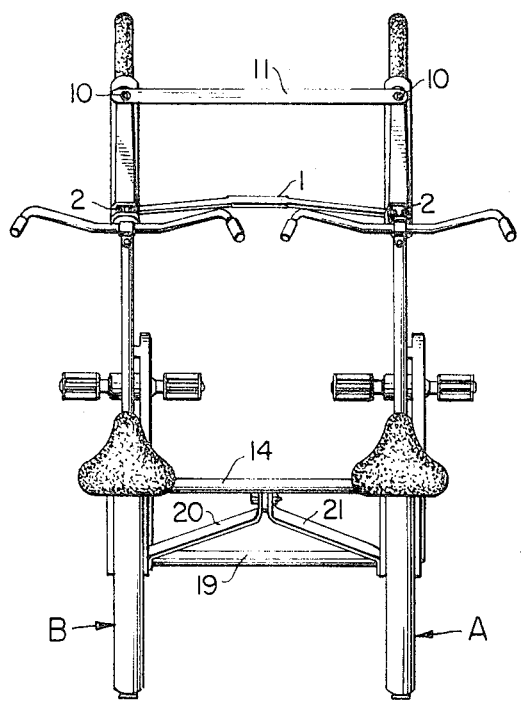
FIG. 2 is a top plan view of the two bicycles showing them connected.

For the purpose of permitting simultaneous and uniform steering of the two bicycles by the rider of the bicycle, the handle bars of which have not been immobilized, suitable steering means as shown in FIGS. 1, 2 and 3 of the drawings is provided.

The steering means comprises elongated plates 7 which are provided near one end with a suitable opening to permit them to be mounted on the stems or standards of the front wheel forks.

Adjusting bolts 8 and 9 with suitable clamping nuts are carried at the rear end and underneath the plates 7. By adjustment of the bolts 8 and 9 the plates 7 may be rigidly held in adjusted angular positions in respect to the alignment of the front wheels and relative fine adjustment of such angle is provided by relative tightening and loosening of the bolts 8 and 9 to permit fine regulation of the angle of the plates to insure free unimpeded and accurate steering of the front wheels of the two bicycles. The adjusting bolts 8 and 9 are shown in detail in FIG. 3A wherein the plate 7 is shown as having its inner end bent downwardly at right angles as shown at 7'. A nut 8' is rigidly attached to the inner side of the right angular portion 7' and the inner end of the adjusting bolt 8 is threaded through this nut 8'. A lock nut 8a is threaded on the bolt 8 and locks the bolt in adjusted positions. By adjusting the bolts 8 and 9 so that their inner ends clamp against the fork of the bicycle, the plate 7 may be adjusted and held firmly in the desired angular position. The bolts 8 and 9 are exactly the same and are spaced on the downwardly bent position 7' so that they will engage each one arm of the front wheel fork of the bicycle. Each of the plates 7 has an upright pin 10 near its outer end on which the ends of the connecting steering bar 11 is mounted. Thus by movement of the unimpeded handle bars, both bicycles may be steered by one rider.

For stability and strength of the connected bicycle structure the two bicycles are further connected intermediate the ends of the bicycles and at the axles of the rear wheel by the structures clearly set out in FIGS. 2, 5 and 6 of the drawings.

A bar or tube 14 which is tubular at its ends extends between the two bicycles at the saddle positions of the bicycles. Mounted on the saddle supporting standard of each bicycle is a structure 15 comprising a split collar 16 mounted on the saddle standard and a tubular element 17 for insertion into the end of the tube or bracing bar 14. The inserting tubular element 17 carries a cam 18 which is movable into or out of gripping position with the interior of the bracing tube 14 by means of an adjusting screw 18 so as to hold the tube 14 rigidly in position or to release it for limited rotary movement.

The bracing bar 14 is connected to a second tubular bracing and spacing member 19, the ends of which are recessed to fit over the inner clamping nuts on the rear wheel axles of the bicycles and this bracing member 19 is connected to the connecting and bracing bar 14 by braces 20 and 21 inclining forwardly and inwardly from their connections with the bracing member 19. Thus, when the adjusting screws 18 are adjusted to release the bracing bar or tube 14 for movement and the nuts on the rear axles of the bicycles are loosened, the member 19 may be moved causing limited rotation of the connecting bracing tube or bar 14 and the adjustment of the chains 20 of the bicycles, thus ensuring uniform chain adjustment and action of the two bicycles. After the chains are properly adjusted the cams are moved into tightening position in the ends of the connecting and bracing tubular bar 14 and the axle nuts of the bicycles are tightened. The bicycles will be connected in rigid predetermined relation to each other so they will move in unison and all danger of tipping or falling over of the bicycles is eliminated.

It will be understood that the invention is not to be limited to the specific construction or arrangement of parts shown, but that they may be modified within the invention defined by the claims.

What I claim is:

1. Apparatus for connecting two bicycles for simultaneous operation in spaced side-by-side relation including: a spacing bar connected to the front ends of the frames of two bicycles, means associated with the handle bars of the bicycles to provide uniform steering of the bicycles by the rider of one of the bicycles, means carried by said bracing bar for rendering the handle bars of one of the bicycles immobile for steering operation whereby the two bicycles may be steered only by the rider of the bicycle whose handle bars are not immobilized, a rigid bracing element connecting the two bicycles intermediate their front and rear portions and a third rigid connecting and spacing element connecting the rear axles of the bicycles.

2. Apparatus for connecting two bicycles as claimed in claim 1, including releasable means connecting the intermediate bracing element to the bicycles to permit limited rotary movement of the intermediate bracing element, means connecting the intermediate bracing element to the rear axle connecting and bracing element so that when the rear axle and bracing element is moved the intermediate bracing element will be slightly rotated to permit uniform adjustment of the chains of the two bicycles in exact unitary degree.

3. Apparatus for connecting two bicycles as claimed in claim 1, wherein said handle bar immobilizing means comprises a plate carried by said bracing bar and having one end engaging the handle bars of one of the bicycles.

4. Apparatus for connecting two bicycles as claimed in claim 1, wherein said means for providing uniform steering of the bicycles includes plates carried by and extending forwardly from the front wheel fork structures of the bicycles, a pair of adjusting screws carried by each plate to provide minute adjustment of the angles of the plates to the front forks of the bicycles, pins carried by the plates and a bar having its ends mounted on the pins and connecting the two plates to ensure uniform steering movement of the front wheels of the bicycles.

5. Apparatus for connecting two bicycles as claimed in claim 4, including means for simultaneously adjusting the chains of both bicycles.

6. Apparatus for connecting two bicycles as claimed in claim 1, and including means for simultaneously adjusting the chains of both bicycles.